(12) United States Patent
Kim et al.

(10) Patent No.: US 8,481,183 B2
(45) Date of Patent: Jul. 9, 2013

(54) SECONDARY BATTERY

(75) Inventors: Bongyoung Kim, Yongin-si (KR);
Sangjoo Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 694 days.

(21) Appl. No.: 12/641,282

(22) Filed: Dec. 17, 2009

(65) Prior Publication Data

US 2010/0159289 A1 Jun. 24, 2010

(30) Foreign Application Priority Data

Dec. 23, 2008 (KR) .................. 10-2008-0132516
Jul. 6, 2009 (KR) .................. 10-2009-0061388

(51) Int. Cl.
*H01M 10/42* (2006.01)

(52) U.S. Cl.
USPC ............................................. 429/7

(58) Field of Classification Search
None
See application file for complete search history.

(56) References Cited

U.S. PATENT DOCUMENTS

| 6,524,739 B1 | 2/2003 | Iwaizono et al. | |
|---|---|---|---|
| 2002/0066582 A1 | 6/2002 | Zayatz | |
| 2006/0093897 A1 | 5/2006 | Choi et al. | |
| 2007/0020517 A1 | 1/2007 | Chun | |
| 2008/0160392 A1* | 7/2008 | Toya et al. | 429/90 |
| 2008/0169788 A1* | 7/2008 | Bobbin et al. | 320/135 |
| 2009/0269620 A1* | 10/2009 | Kim | 429/7 |

FOREIGN PATENT DOCUMENTS

| CN | 2793934 Y | 7/2006 |
|---|---|---|
| EP | 1 760 804 A1 | 3/2007 |
| JP | 09-063552 | 3/1997 |
| JP | 09-171804 | 6/1997 |
| JP | 2000-149918 | 5/2000 |
| JP | 2002-124248 | 4/2002 |
| JP | 2003-516604 | 5/2003 |
| JP | 2008-181855 | 8/2008 |
| KR | 10-2001-0024564 A | 3/2001 |
| KR | 20-0326889 Y1 | 9/2003 |
| KR | 10-0459496 B1 | 12/2004 |
| KR | 10-0670453 B1 | 1/2007 |
| WO | WO 00/79635 A1 | 12/2000 |

OTHER PUBLICATIONS

Patent Abstracts of Japan and English machine translation for Japanese publication JP 2008-181855 (21 pages).
Office Action dated Feb. 22, 2012 issued by the SIPO for a corresponding Chinese Patent Application No. 2009/10262033, and English Translation, 11 pages.
European Search Report dated Mar. 17, 2010, for corresponding European Patent application 09180100.1.
Korean Patent Abstracts, Publication No. 10-2003-0087981, dated Nov. 15, 2003.
Korean Patent Abstracts, Publication No. 10-2006-0118958, dated Nov. 24, 2006.
Japanese Office action dated Jul. 3, 2012 issued in corresponding Japanese patent application No. 2009-279751, 3 pages.

* cited by examiner

*Primary Examiner* — Patrick Ryan
*Assistant Examiner* — Wyatt McConnell
(74) *Attorney, Agent, or Firm* — Christie, Parker & Hale, LLP

(57) ABSTRACT

A secondary battery includes a cylindrical bare cell including a cylindrical can configured as a first electrode and an electrode cap configured as a second electrode, the electrode cap coupled with the cylindrical can and a protection circuit module including a circuit board facing the electrode cap, a first electrode tab electrically connecting the circuit board to the cylindrical and a second electrode tab electrically connecting the circuit board to the electrode cap of the cylindrical bare cell.

32 Claims, 15 Drawing Sheets

SECONDARY BATTERY

CROSS-REFERENCE TO RELATED APPLICATION

This application claims priority to and the benefit of Korean Application No. 10-2008-0132516, filed on Dec. 23, 2008, and Korean Application No. 10-2009-0061388, filed on Jul. 6, 2009, in the Korean Intellectual Property Office, the entire content of which is incorporated herein by reference.

BACKGROUND OF THE INVENTION

1. Field of the Invention

The present invention relates to a secondary battery and, more particularly to, a secondary battery having a cylindrical bare cell.

2. Description of the Related Art

In recent years, due to rapid development of the electronics, communications, and computer industries, portable electronic devices are being widely used. Further, rechargeable secondary batteries are primarily used as power sources of such portable electronic devices.

Currently, pack type batteries are being widely used as secondary batteries. A pack type battery is a unit in which a bare cell providing electric energy and a protection circuit module (PCM) controlling charging and discharging of the bare cell are integrated. The PCM includes a circuit board to which various circuit devices are mounted.

According to the related art, when a bare cell is cylindrical, a circuit board of the PCM is positioned at a round side of the bare cell. Due to the position of the circuit board of the PCM at the round side of the bare cell, additional connecting terminals may be required to connect the PCM to an external device. Moreover, the circuit board of the PCM is connected to the connecting terminals by wires, but the wires may be easily damaged during the use.

SUMMARY OF THE INVENTION

Embodiments of the present invention provide a secondary battery allowing for a reduction in the number of parts and manufacturing costs and having a cylindrical bare cell to which a PCM is coupled and which is not easily damaged by an external shock.

In one embodiment, a secondary battery includes a cylindrical bare cell including a cylindrical can configured as a first electrode and an electrode cap configured as a second electrode, the electrode cap coupled with the cylindrical can and a protection circuit module including a circuit board facing the electrode cap, a first electrode tab electrically connecting the circuit board to the cylindrical can and a second electrode tab electrically connecting the circuit board to the electrode cap of the cylindrical bare cell.

In one embodiment, the cylindrical can includes a bottom plate and a side wall extending from the bottom plate, wherein the first electrode tab is welded to the side wall of the cylindrical can. Further, the first electrode tab includes a base attached to the circuit board and an extension extending from the base and enveloping an upper side of the side wall of the cylindrical can. The extension of the first electrode tab includes a first branch and a second branch separated from each other and the side wall of the cylindrical can includes a beading recessed from the cylindrical can, a locker of the first electrode tab being in the beading.

In one embodiment, the first electrode tab includes a base attached to the circuit board of the protection circuit module, a first extension extending from the base to the cylindrical bare cell and a coupler bent and extending from the first extension and coupled to a top of the side wall of the cylindrical can. The first electrode tab further includes a second extension extending from the coupler and enveloping the side wall of the cylindrical can. In one embodiment, the circuit board has a recess adapted to expose the coupler of the first electrode tab.

In another embodiment, there may be two first electrode tabs, wherein the two first electrode tabs are opposite to each other with respect to a center of the circuit board. Further, in one embodiment, the second electrode tab includes a base attached to the circuit board, an extension bent from the base and extending toward the cylindrical bare cell and a coupler bent from the extension and coupled to the electrode tab of the cylindrical bare cell by welding. Further, the circuit board includes a through-hole corresponding to the coupler of the second electrode tab and an external terminal for charge and discharge.

In another embodiment, a secondary battery is provided including a first cylindrical bare cell and a second cylindrical bare cell in parallel and each including a cylindrical can configured as a first electrode and an electrode cap configured as a second electrode, each electrode cap coupled with a respective cylindrical can and a protection circuit module including a circuit board facing the electrode cap of the first cylindrical bare cell and the second cylindrical bare cell, two first electrode tabs electrically connecting the circuit board to the cylindrical can of the first cylindrical bare cell and to the electrode cap of the second cylindrical bare cell and a second electrode tab electrically connecting the circuit board to the electrode cap of the first cylindrical bare cell and the electrode cap of the second cylindrical bare cell. In one embodiment, a backing member is between the first cylindrical bare cell and the second cylindrical bare cell. Further, the protection circuit module includes an auxiliary tab electrically connecting the circuit board to the cylindrical can of the second cylindrical bare cell.

BRIEF DESCRIPTION OF THE DRAWINGS

The features and aspects of the present invention will be more apparent from the following detailed description in conjunction with the accompanying drawings.

DETAILED DESCRIPTION OF THE INVENTION

Hereinafter, secondary batteries according to various embodiments of the present invention will be described in detail with reference to the accompanying drawings.

Figure 1:
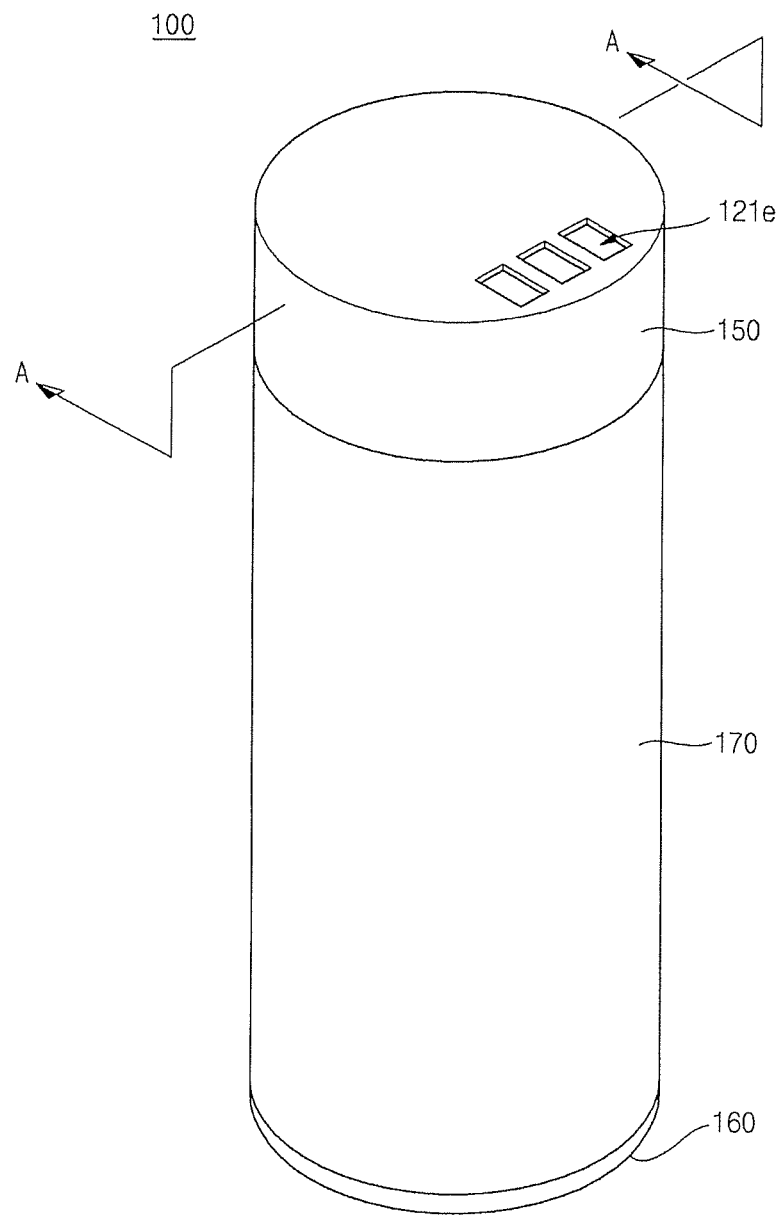
FIG. 1 is a perspective view illustrating a secondary battery according to an embodiment of the present invention.
Figure 2:
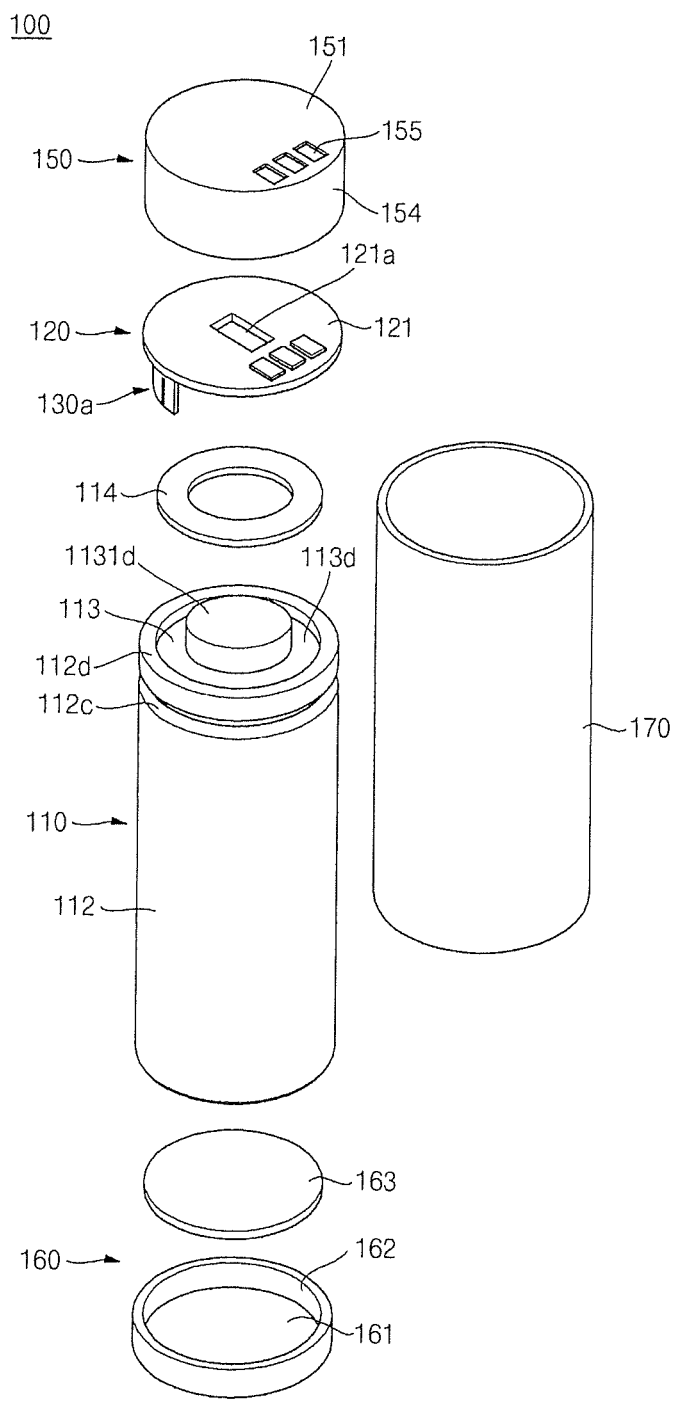
FIG. 2 is an exploded perspective view illustrating the secondary battery of FIG. 1.
Figure 3:
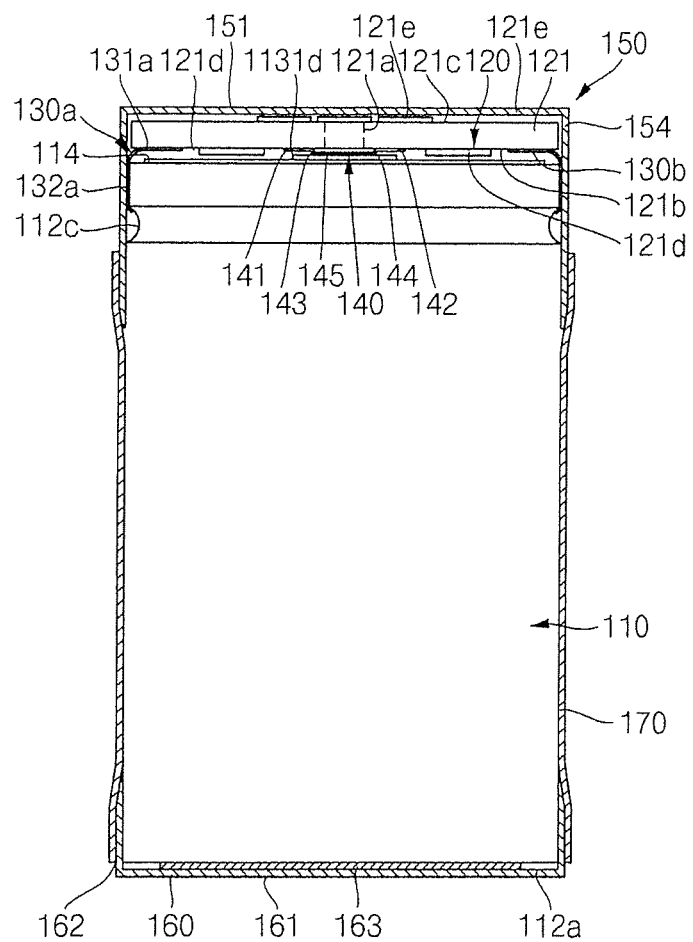
FIG. 3 is a side sectional view illustrating the inside of a top case, a bottom case, and a label of the secondary battery of FIG. 1, taken along the line A-A.
Figure 4:
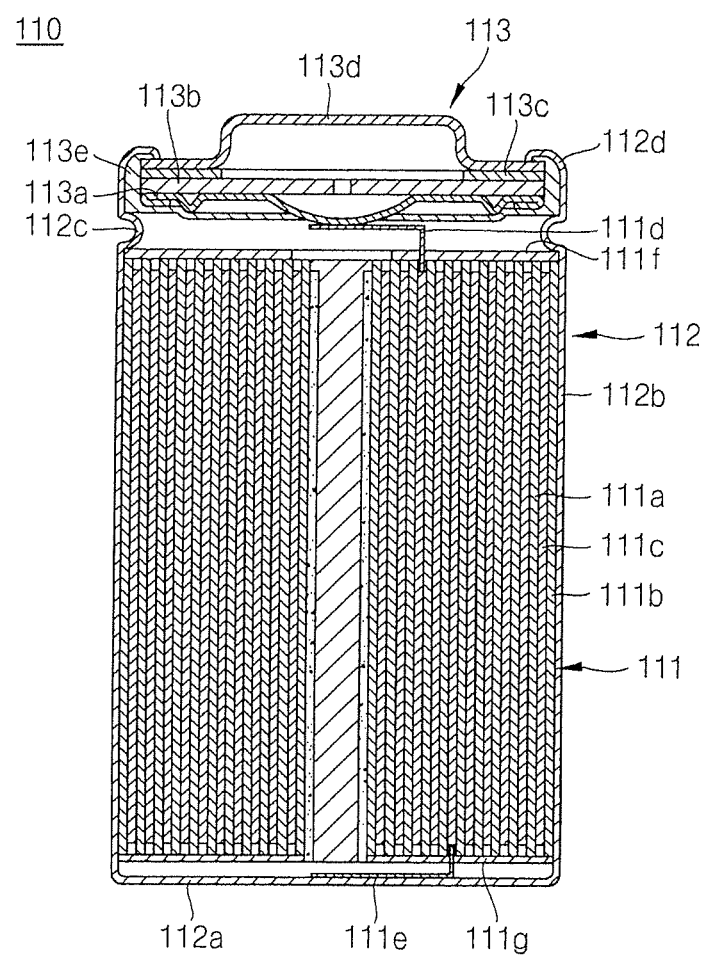
FIG. 4 is a sectional view illustrating a cylindrical bare cell of the secondary battery of FIG. 2.
Figure 5:
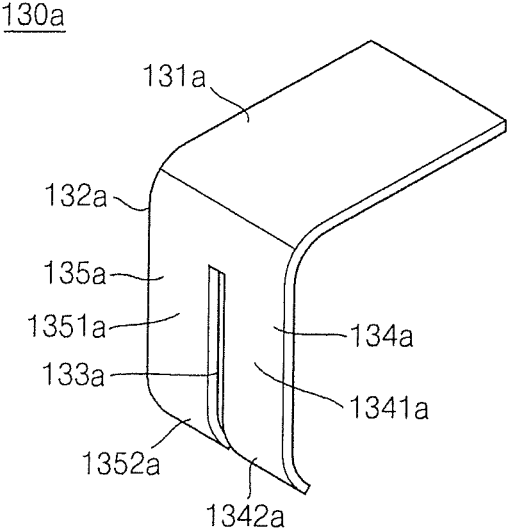
FIG. 5 is a perspective view illustrating a first electrode tab of the secondary battery of FIG. 2.

FIG. 1 is a perspective view illustrating a secondary battery according to an embodiment of the present invention, FIG. 2 is an exploded perspective view illustrating the secondary battery of FIG. 1, and FIG. 3 is a side sectional view, taken along the line A-A, illustrating the inside of a top case, a bottom case, and a label of the secondary battery of FIG. 1. FIG. 4 is a sectional view illustrating a cylindrical bare cell of FIG. 2. FIG. 5 is a perspective view illustrating a first electrode tab of FIG. 2.

Referring to FIGS. 1 to 3, a secondary battery 100 includes a cylindrical bare cell 110, a PCM 120, a top case 145, a bottom case 160, and a label 170.

The cylindrical bare cell 110 supplies electrical energy, and its vertical sectional view is illustrated in FIG. 4. Referring to FIG. 4, the cylindrical bare cell 110 includes an electrode assembly 111, a cylindrical can 112, and a cap assembly 113.

The electrode assembly 110 includes a positive electrode plate 111a coated with positive electrode active materials, a negative electrode plate 111b coated with negative electrode active materials, and a separator 111c disposed between the two electrode plates 111a, 111b to prevent a short circuit therebetween and to allow only lithium ions to move. The electrode plates 111a, 111b and the separator 111c are wound as a jelly-roll configuration. Electrode tabs 111d, 111e are attached to the electrode plates 111a, 111b, respectively. The positive electrode tab 111d attached to the positive electrode plate 111a is usually made of aluminum and the negative electrode tab 111e attached to the negative electrode plate 111b is usually made of nickel, but the present invention is not limited thereto. A first insulation plate 111f and a second insulation plate 111g are attached to ends of the electrode assembly 111 for insulation.

The cylindrical can 112 accommodates the electrode assembly 111 and electrolyte. The cylindrical can 112 is usually made of aluminum (Al), steel, or an alloy thereof. The cylindrical can 112 includes a circular bottom plate 112a and a side wall 112b extending from the edge of the circular bottom plate 112a. The cylindrical can 112 has an open top to accommodate the electrode assembly 111. The negative electrode tab 111e of the electrode assembly 111 is attached to the bottom plate 112a of the cylindrical can 112. Thus, the cylindrical can 112 has the same polarity as the attached negative electrode tab 111e and serves as a negative terminal. At the upper side of the side wall 112b of the cylindrical can 112, a ring-shaped beading 112c extends in the circumferential direction. The beading 112c is recessed to prevent the lower electrode assembly 111 from moving and to support the upper cap assembly 113. The upper side of the side wall 112b of the cylindrical can 112 is bent inwardly to form a crimping 112d. The crimping 112d covers the top edge of the cap assembly 113 and to fix the cap assembly 113.

The cap assembly 113 covers the open top of the cylindrical can 112. The cap assembly 113 includes an electrical conductive safety vent 113a, a printed circuit board (PCB) 113b, a positive temperature coefficient (PTC) device 113c, a terminal cap 113d, and an insulating gasket 113e. The safety vent 113a changes shape during overcharge or abnormal heating of the secondary battery and cuts off the electrical connection of patterns of the PCB 113b. The safety vent 113a is electrically connected to the positive electrode tab 111d of the electrode assembly 111. The PCB 113b is electrically and mechanically connected to the top of the safety vent 113a. The pattern of the PCB 113b is electrically disconnected from the positive electrode tab 111d of the electrode assembly 111 by the shape change of the safety vent 113a. The PTC device 113c is electrically and mechanically connected to the top of the PCB 113b. The resistance of the PTC device 113c increases due to the overcharge or the abnormal heating of the secondary battery, resulting in cutting off the connection of an internal circuit of the secondary battery. The terminal cap 113d is electrically and mechanically connected to the top of the PTC device 113c. The terminal cap 113d supplies an actual current of the secondary battery to the PCM 120. The electrode cap 113 has a protrusion 1131d formed at the center thereof to allow an easy connection.

The insulating gasket 113e wraps around the outer circumference of the laminate, in which the safety vent 113a, the PCB 113b, the PTC device 113c, and the electrode cap 113 are sequentially laminated, to integrate the cap assembly 113. The insulating gasket 113e is fixed between the beading 112c and the crimping 112d of the cylindrical can 112. The insulating gasket 113e insulates the safety vent 113a, the PCB 113b, the PTC device 113c, and the terminal cap 113d from the cylindrical can 112.

Although in the description with respect to the bare cell 110, the cylindrical can 112 has a negative polarity and the terminal cap 113d has a positive polarity, the present invention is not limited thereto. The connections of the positive electrode tab 111d and the negative electrode tab 111e of the electrode assembly 111 may be reversed so that the cylindrical can 112 may have a positive polarity and the terminal cap 113d may have a negative polarity.

The PCM 120 is coupled with the bare cell 110 to control the operation of the secondary battery 100 including charge/discharge of the bare cell 110.

Referring to FIGS. 2 and 3, the PCM 120 includes a circuit board 121, two first (negative) electrode tabs 130a, 130b and a second (positive) electrode tab 140.

The circuit board 121 is a circular printed circuit board on which wiring patterns are printed and has a size substantially corresponding to the top of the cylindrical bare cell 110. The circuit board 121 has a through-hole 121a formed in the center of the circuit board through which a welding rod passes. The circuit board 121 includes a first side 121b and a second side 121c opposite to the first side 121b. The first electrode tabs 130a, 130b are respectively coupled to two ends of the first side 121b symmetrical to each other in the radial direction. The second electrode tab 140 is coupled to the center of the first side 121b. The first side 121b faces and is spaced from the electrode cap 113d of the cap assembly 113 of the cylindrical bare cell 110. Electric circuit devices 121d are mounted on the first side 121b of the circuit board 121. The electric circuit devices 121d may include a control IC, charge-discharge switch, a temperature fuse, among others. The electric circuit devices 121d are insulated from the electrode cap 113d by an insulation tape 114 attached to the electrode cap 113d, except for the protrusion 1131d. The insulation tape 114 is made of polyethylene terephthalate (PET), but the present invention is not limited thereto.

The second side 121c of the circuit board 121 has an external terminal 121e adapted to be electrically connected to an external load or a charger.

Referring to FIG. 3, the first electrode tabs 130a, 130b are positioned at the ends of the circuit board 121 symmetrical to each other in the radial direction. The first electrode tabs 130a, 130b are made by bending an electrical conductive plate such as nickel and electrically connect the circuit board 121 of the PCM 120 to the cylindrical can 112 of the bare cell 110.

FIG. 5 illustrates a detailed configuration of one of the two identical first electrode tabs 130a, 130b. Referring to FIG. 5, the first electrode tab 130a includes a base 131a and an extension 132a bent and extending from a base 131a.

The base 131a is a planar rectangular plate and is attached and electrically connected to the first side 121b of the circuit board 121.

The extension 132a forms a right angle with respect to the base 131a. The extension 132a has a slit 133a extending to the end of the extension 132a in the longitudinal direction. The slit 133a separates a first branch 134a and a second branch 134a. The first branch 134a includes a coupler 1341a and a locker 1342a bent from the coupler 1341a, which are sequentially positioned in the longitudinal direction. The coupler 1341a contacts the side wall 112b of the can 112 between the beading 112c and the crimping 112d of the can 112 of the bare cell 110. The locker 1342a is inserted into the beading 112c of the can 112 to assist the first electrode tab 130a to be fixed to the can 112. The second branch 135a, like the first branch 134a, includes a coupler 1351a and a locker 1352a and has substantially the same configuration as the first branch. The coupler 1341a of the first branch 134a and the coupler 1351a of the second branch 135a are coupled to the side wall 112b of the can 112 of the bare cell 110 by resistance welding. In this case, the resistance welding is performed such that two electrodes of a welding machine press the coupler 1341a of the first branch 134a and the coupler 1351a of the second branch 1351a. Since the two branches 134a, 135a are separated from each other by the slit 133a, the couplers 1341a, 1351a make sufficient contact with the round side wall 112b of the cylindrical can 112 so that the resistance welding can be effectively performed.

Referring back to FIG. 3, the second electrode tab 140 is positioned corresponding to the through-hole 121a formed in the circuit board 121 of the PCM 120. The second electrode tab 140 is made by bending an electrical conductive plate such as nickel, and electrically connects the circuit board 121 of the PCM 120 to the electrode cap 113d of the cap assembly 113.

Figure 6:
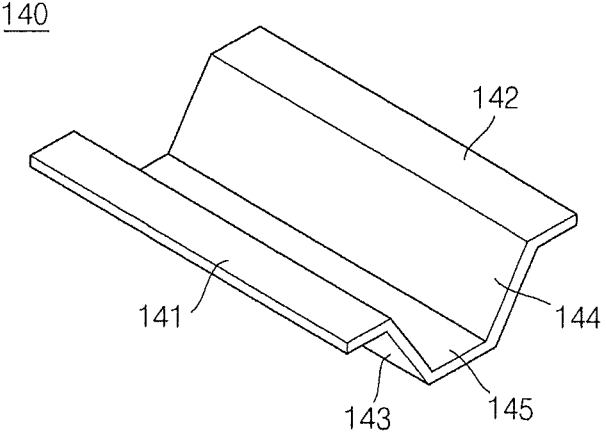
FIG. 6 is a perspective view illustrating a second electrode tab of the secondary battery of FIG. 3.

FIG. 6 illustrates configuration of the second electrode tab 140 in detail. Referring to FIG. 6, the second electrode tab 140 includes first and second bases 141, 142, first and second extensions 143, 144 bent and extending from the first and second bases 141, 142 respectively, and a coupler 145 coupling the two extensions 143, 144 to each other.

The first and second bases 141, 142 are planar plates and are attached and electrically connected to both sides of the through-hole 121a on the first side 121b of the circuit board 121.

The first extension 143 is bent from the first base 141 and extends toward the electrode cap 113d of the bare cell 110. The second extension 144 is bent from the second base 142 and extends toward the electrode cap 113d of the bare cell 110.

The coupler 145 is a planar rectangular plate and connects an edge or end of the first extension 143 to an edge or end of the second extension 144. The coupler 145 is connected to the protrusion 1131d formed in the electrode cap 113d of the bare cell 110. The coupler 145 and the protrusion 1131d formed in the electrode cap 113d of the bare cell 110 are coupled with each other by the resistance welding performed with a welding rod inserted through the through-hole 121a of the circuit board 121.

The top case 150 accommodates and protects the PCM 120. The top case 150 includes a cover plate 151 and a side wall 154 extending from the cover plate 151.

The cover plate 151 has a circular shape roughly mating with the cap assembly 113 of the bare cell 110. The cover plate 151 has a through-hole 155. The external terminal 121e of the PCM 120 is exposed to the exterior through the through-hole 155. The inner side of the cover plate 151 faces the second side 121c of the circuit board 121 of the PCM 120.

The end of the side wall 154 extends downward to cover the top of the side wall 112b of the cylindrical can 112 of the bare cell 110. The side wall 154 has a locking step formed in the inner side of the side wall 154 and is locked by the top of the side wall 112b of the cylindrical can 112.

The bottom case 160 includes a bottom plate 161 and a side wall 162 extending upward from the bottom plate 161. The bottom plate 161 has a shape roughly similar to that of the bottom plate 112a of the cylindrical can 112 of the bare cell 110, and is attached to the bottom plate 112a of the cylindrical can 112 of the bare cell 110 by an adhesive member 163 such as a double-sided tape. The side wall 162 envelops the lower side of the side wall 112b of the cylindrical can 112 of the bare cell 110.

The label 170 is attached to the side wall 112b of the cylindrical can 112 of the bare cell 110 to envelop the side wall 112b. The label 170 is also attached to a part of the side wall 154 of the top case 150 and on the side wall 162 of the bottom case 160.

Next, a PCM employed in a secondary battery according to another embodiment of the present invention will be described in detail.

Figure 7:
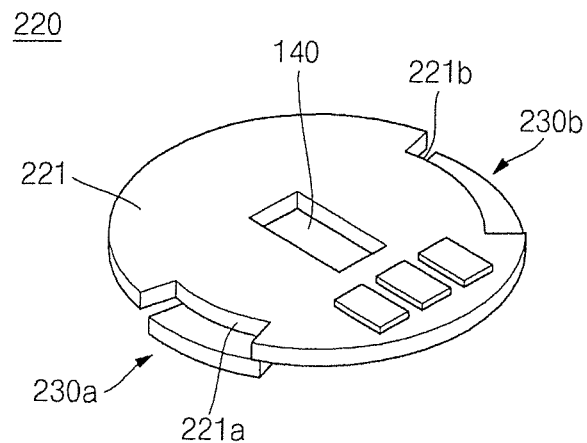
FIG. 7 is a perspective view illustrating another embodiment of a PCM of a secondary battery of the present invention.

FIG. 7 illustrates a PCM employed in a secondary battery according to another embodiment of the present invention. Referring to FIG. 7, a PCM 220 includes a circuit board 221, two first electrode tabs 230a, 230b, and a second electrode tab 140.

The circuit board 221 has a roughly circular shape and a first opening recess 221a and a second opening recess 221b which are substantially symmetrical with respect to the center of the circuit board 221. The opening recesses 221a, 221b are recessed from the edge of the circuit board 221. The opening recesses 221a, 221b expose the first electrode tabs 230a, 230b such that laser welding is enabled.

Figure 8:
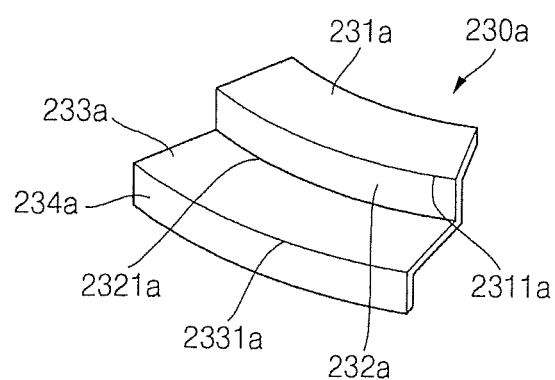
FIG. 8 is a perspective view illustrating a first electrode tab of the PCM of FIG. 7.

The first electrode tabs 230a, 230b are made by bending electrical conductive plates such as nickel and electrically connect the circuit board 221 to the cylindrical can 112 of the bare cell 110. FIG. 8 illustrates a detailed configuration of one of the two identical first electrode tabs 230a, 230b. Referring to FIG. 8, the first electrode tab 230a includes a base 231a, a first extension 232a bent and extending from a base 231a, a coupler 233a bent and extending from the first extension 232a, and a second extension 234a bent and extending from the coupler 233a. The base 231a is an arc-shaped plate with a preset width and is electrically connected and attached to a corresponding position of the first opening recess 221a of the circuit board 221. The first extension 232a extends downward, that is, in the direction opposite to the circuit board 221, from an edge or end 2311a positioned at an outer side in the radial direction (periphery) of the base 231a. The coupler 233a is an arc-shaped plate with a preset width and extends outwardly from a lower edge or end 2321a of the first extension 232a in the radial direction. The coupler 233a is placed on the crimping 122d of the cylindrical can 112 of the bare cell 110 and is coupled with the crimping 122d, for example, by the laser welding. The second extension 234a extends downwardly from an edge or end 2331a positioned at an outer side in the radial direction of the coupler 233a. The second extension 234a contacts the side wall 112b of the cylindrical can 112 of the bare cell 110. Configurations and operations of other components are similar to those of the PCM 120 as illustrated in FIG. 2.

Next, a secondary battery according to still another embodiment of the present invention will be described in detail.

Figure 9:
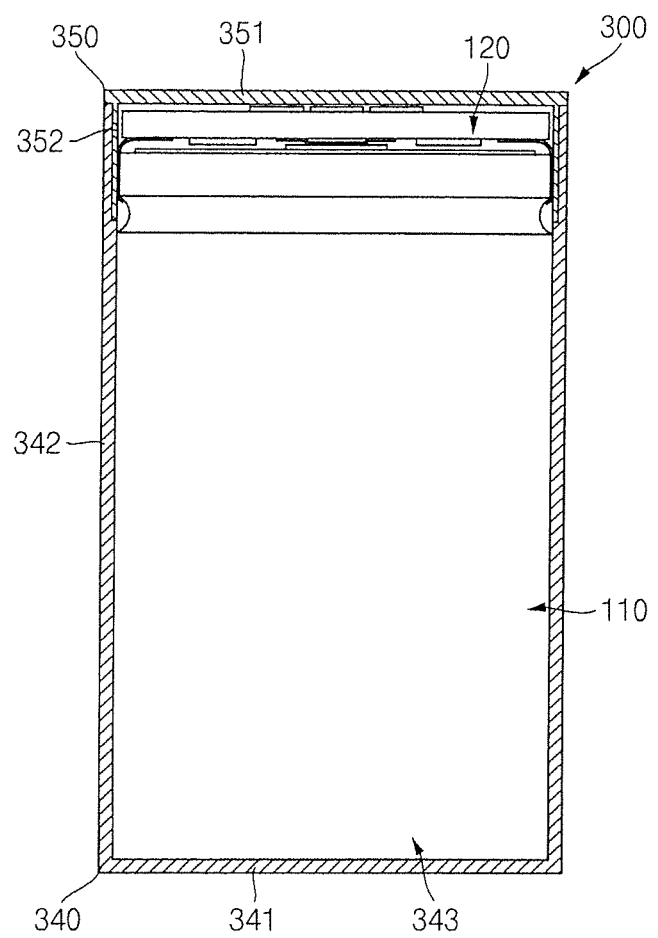
FIG. 9 is a side view illustrating a secondary battery according to another embodiment of the present invention.

FIG. 9 illustrates a secondary battery according to still another embodiment of the present invention. Referring to FIG. 9, a secondary battery 300 includes a bare cell 110, a PCM 120, a cylindrical can 340, and a cover 350. Since configurations and operations of the bare cell 110 and the PCM 120 are the same as those of FIGS. 1 to 6, their descriptions will be omitted.

The cylindrical can 340 includes a bottom plate 341 and a side wall 342 upwardly extending from the bottom plate 341. The cylindrical can 340 has an opened top. The cylindrical can 340 provides an internal space 343 for accommodating the bare cell 110 with which the PCM 120 is coupled.

The cover 350 includes a cover lid 351, and an extension 352 downwardly extending from the cover lid 351. The cover lid 351 stops the opened top of the cylindrical can 340. The rim of the cover lid 351 contacts the side wall 342 of the cylindrical can 340 and the contact is fixed to the side wall 342 by ultrasonic welding. The extension 352 is fitted into the cylindrical can 340.

Since the bare cell 110 and the PCM 120 are protected by the cylindrical can 340 and the cover 350, durability against an external shock is enhanced.

Next, a secondary battery according to still another embodiment of the present invention will be described in detail.

Figure 10:
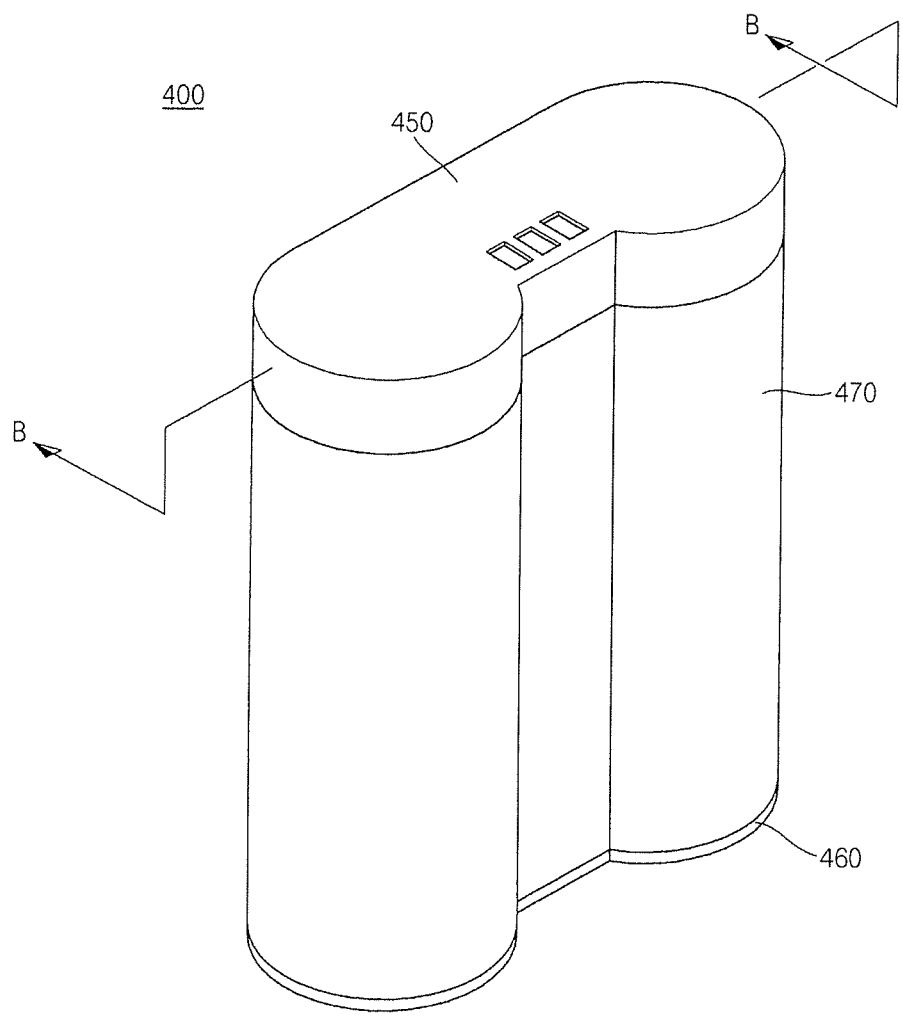
FIG. 10 is a perspective view illustrating a secondary battery according to still another embodiment of the present invention.
Figure 11:
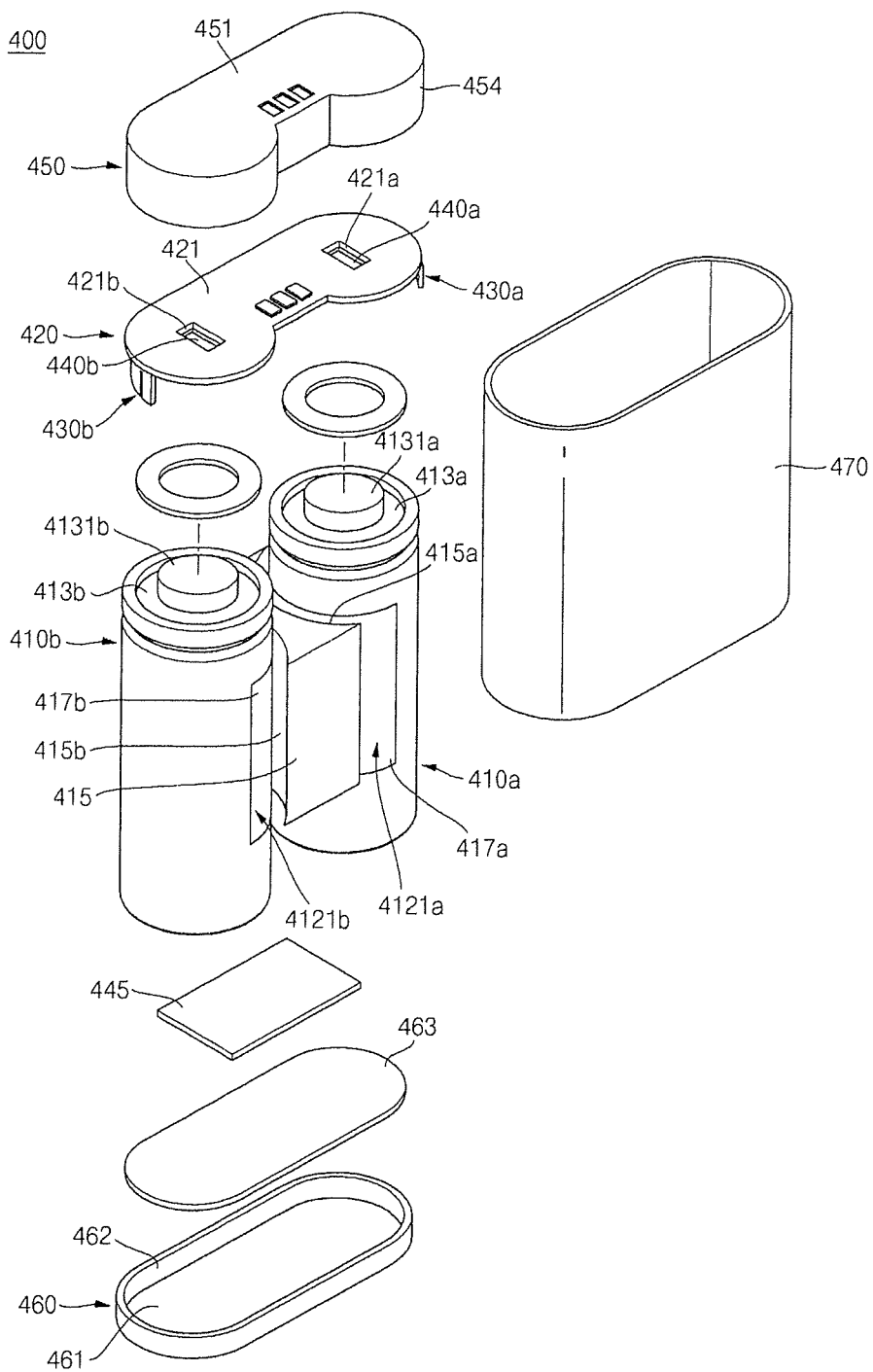
FIG. 11 is an exploded perspective view illustrating the secondary battery of FIG. 10.
Figure 12:
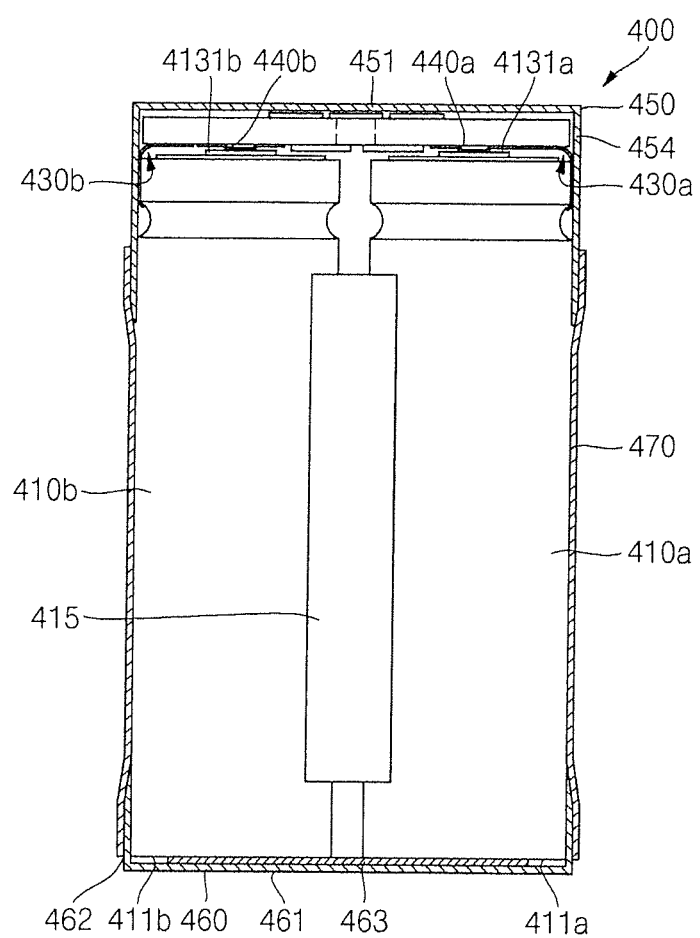
FIG. 12 is a side view illustrating the inside of a top case, a bottom case, and a label of the secondary battery of FIG. 10, taken along the line B-B.

FIGS. 10 to 12 are views illustrating a secondary battery according to still another embodiment of the present invention. The embodiment illustrated in FIGS. 10 to 12 relate to a secondary battery in which two parallel cylindrical bare cells are connected to each other in parallel. Referring to FIGS. 10 to 12, a secondary battery 400 includes first and second bare cells 410a, 410b, a backing member 415, a PCM 420, an electrode connecting tab 445, a top case 450, a bottom case 460, and a label 470.

Since configurations and operations of the first and second cylindrical bare cells 410a, 410b are identical to that of the bare cell 110 as illustrated in FIG. 2, their description will be omitted. The cylindrical bare cells 410a, 410b are arranged in parallel. Each of the electrode tabs 413a, 413b of the cylindrical bare cells 410a, 410b faces the same direction (upward in the drawings).

The backing member 415 maintains a proper gap between the parallel cylindrical bare cells 410a, 410b. The backing member 415 includes a first side 415a facing a side wall 4121a of a cylindrical can 412a of the first cylindrical bare cell 410a, and a second side 415b opposite to the first side 415a and facing a side wall 4121b of a cylindrical can 412b of the second cylindrical bare cell 410b. The first side 415a of the backing member 415 has a depressed arc shape adapted to mate with a shape of the side wall 4121a of the cylindrical can 412a of the first cylindrical bare cell 410a. The first side 415a of the backing member 415 is coupled with the side wall 4121a of the cylindrical can 412a of the first cylindrical bare cell 410a by a coupler such as a first double-sided tape 417a. The second side 415b of the backing member 415 has a depressed arc shape adapted to mate with a shape of the side wall 4121b of the cylindrical can 412b of the second cylindrical bare cell 410b. The second side 415b of the backing member 415 is coupled with the side wall 4121b of the cylindrical can 412b of the second cylindrical bare cell 410b by a coupler such as a second double-side tape 417b.

The PCM 420 includes a circuit board 421, two first electrode tabs 430a, 430b, and two second electrode tabs 440a, 440b.

The circuit board 121 has first and second through-holes 421a, 421b through which welding rods pass. The first through-hole 421a is positioned to generally correspond to a protrusion 4131a of the electrode tab 413a of the first cylindrical bare cell 410a, and the second through-hole 421b is positioned to generally correspond to a protrusion 4131b of the electrode tab 413b of the second cylindrical bare cell 410b. Other configurations and operations are the same as the circuit board 121 illustrated in FIG. 2 and their description will be omitted.

Referring to FIG. 12, the first electrode tabs 430a, 430b are positioned, one at either edge or end of the circuit board 421. One of the first electrode tabs 430a, 430b is electrically connected to the cylindrical can 412a of the first cylindrical bare cell 410a and the other is electrically connected to the cylindrical can 412b of the second cylindrical bare cell 410b. Other configurations and operations of the first electrode tabs 430a, 430b are the same as those of the first electrode tabs 130a, 130b as illustrated in FIGS. 2 to 5 and their description will be omitted.

Referring to FIGS. 11 and 12, one of the second electrode tabs 440a corresponds to the first through-hole 421a of the circuit board 421 of the PCM 420 and the other 440b corresponds to the second through-hole 421b of the circuit board 421 of the PCM 420. One of the second electrode tabs 440a, 440b is electrically connected to the protrusion 4131a of the electrode cap 413a of the first cylindrical bare cell 410a and the other is electrically connected to the protrusion 4131b of the electrode cap 413b of the second cylindrical bare cell 410b. Other configurations and operations of the second electrode tabs 440a, 440b are the same as that of the second electrode tab 140 as illustrated in FIGS. 2 to 5 and their description will be omitted.

The electrode connecting tab 445 is made of an electrical conductive material such as nickel and is electrically coupled with a bottom plate 411a of the first cylindrical can 412a of the first cylindrical bare cell 410a and a bottom plate 411b of the second cylindrical can 412b of the second cylindrical bare cell 410b, for example, by resistance welding.

The top case 450 accommodates and protects the PCM 420. The top case 450 includes a cover plate 451 and a side wall 454 downwardly extending from the cover plate 451. The cover plate 451 has a shape enveloping the top of the bare cells 410a, 410b. Other configurations and operations of the top case 450 are the same as that of FIGS. 2 and 3 and their description will be omitted.

The bottom case 460 includes a bottom plate 461 and a side wall 162 upwardly extending from the bottom plate 461. The bottom plate 461 has a shape enveloping the bottom plates 411a, 411b of the cylindrical cans 412a, 412b of the two bare cells 410a, 410b, and is attached to the bottom plates 411a, 411b of the cylindrical cans 412a, 412b of the bare cells 410a and 410b by an adhesive member 463 such as a double-sided tape. Other configurations and operations of the bottom case 460 are the same as that of FIGS. 2 and 3 and their description will be omitted.

The label 470 is attached to the sides of the cylindrical cans 412a, 412b of the bare cells 410a, 410b to wrap the bare cells. The label 470 is also attached to a part of the side wall 454 of the top case 450 and on the side wall 462 of the bottom case 460.

Next, a secondary battery according to still another embodiment of the present invention will be described.

Figure 13:
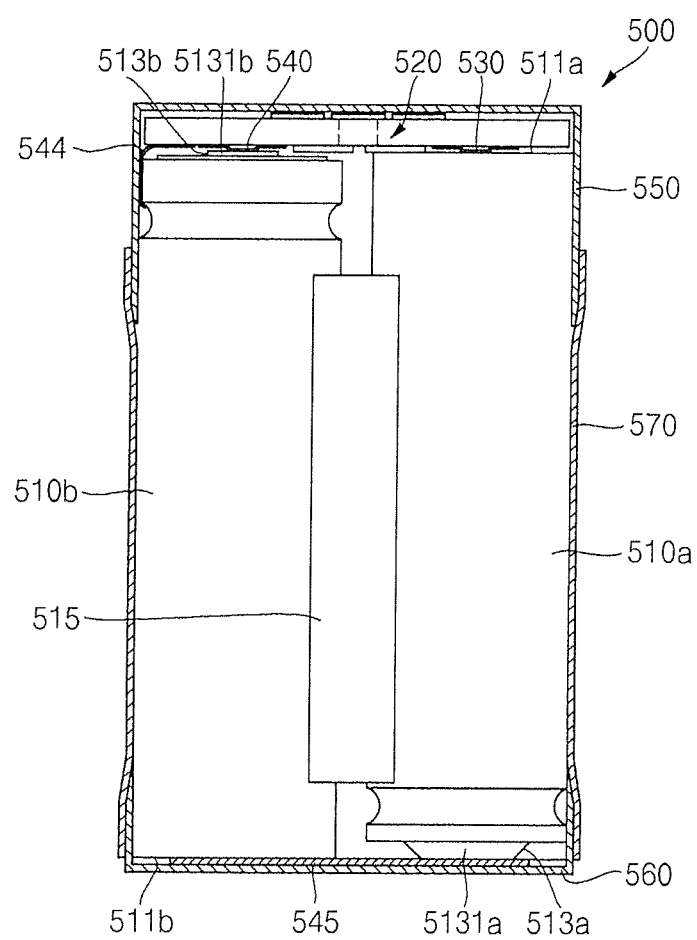
FIG. 13 is a side view illustrating a secondary battery according to still another embodiment of the present invention.

FIG. 13 illustrates the secondary batter according to still another embodiment of the present invention. FIG. 13 illustrates a secondary battery in which two parallel cylindrical bare cells are connected to each other in series. Referring to FIG. 13, a secondary battery 500 includes first and second bare cells 510a, 510b, a backing member 515, a PCM 520, an electrode connecting tab 545, a top case 550, a bottom case 560, and a label 570.

The first and second cylindrical bare cells 510a, 510b are arranged in parallel. Respective electrode caps 513a, 513b of the cylindrical bare cells 510a, 510b face opposite directions. In the drawing, the electrode cap 513a of the first cylindrical bare cell 510a faces downwardly and the electrode cap 513b of the second cylindrical bare cell 510b faces upwardly. Other configurations and operations of the first and second cylindrical bare cells 510a, 510b are the same as those of the embodiment described with reference to FIG. 11 and their description will be omitted.

The PCM 520 includes a circuit board 521, a first electrode tab 530, a second electrode tab 540, and an auxiliary tab 544. Configuration and operation of the circuit board 521 is the same as those described with reference to FIG. 11 and their description will be omitted. The first and second electrode tabs 530, 540 are substantially the same as the second electrode tabs 440a, 440b as illustrated in FIG. 12. The first electrode tab 530 is electrically connected to a bottom plate 511a as a first electrode of the first cylindrical bare cell 510a. The second electrode tab 540 is electrically connected to a protrusion 5131a of the electrode cap 513a as a second electrode of the second cylindrical bare cell 510a.

The auxiliary tab 544 is substantially the same as the electrode tab 130a as illustrated in FIG. 5 and electrically connects the circuit board 521 to the second electrode of the second cylindrical bare cell 510a. The auxiliary tab 544 is connected between the bare cells 510a, 510b which are connected to each other in series, and enables independent measuring of information such as voltages of the respective bare cells 510a, 510b.

The electrode connecting tab 545 is made of electrical conductive material such as nickel and is electrically coupled to the protrusion 5131a of the electrode cap 513a of the first cylindrical bare cell 510a and to the bottom plate 511b of the second cylindrical bare cell 510b, for example by resistance welding.

Other configurations and operations of the electrode connecting tab 545 are the same as those described in the embodiment of FIGS. 10 to 12 and their description will be omitted.

Hereinafter, a secondary battery according to another embodiment of the present invention will now be described in detail with reference to FIGS. 14 through 18.

Figure 14:
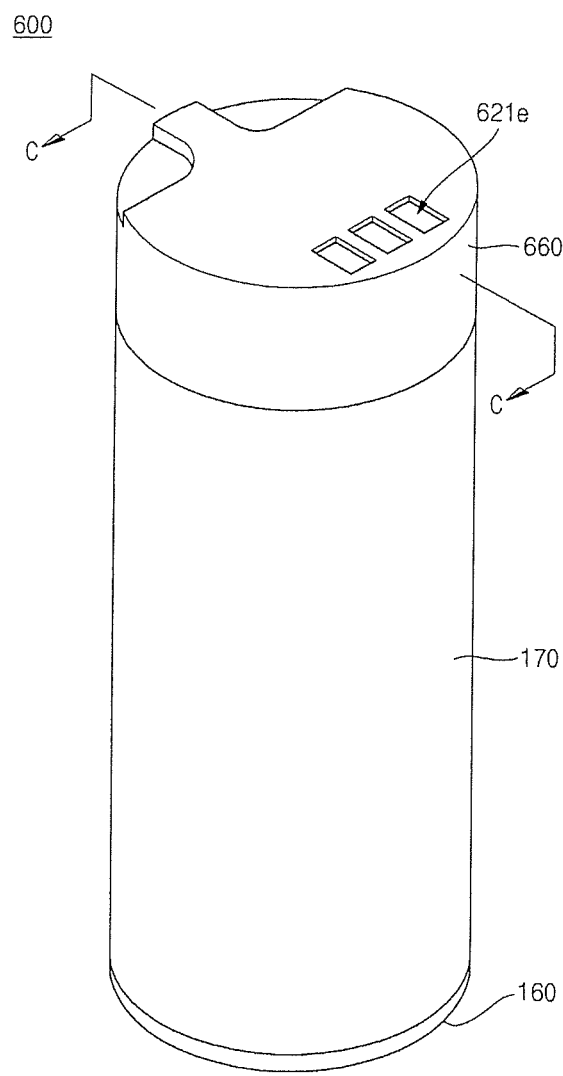
FIG. 14 is a perspective view illustrating a secondary battery according to another embodiment of the present invention.
Figure 15:
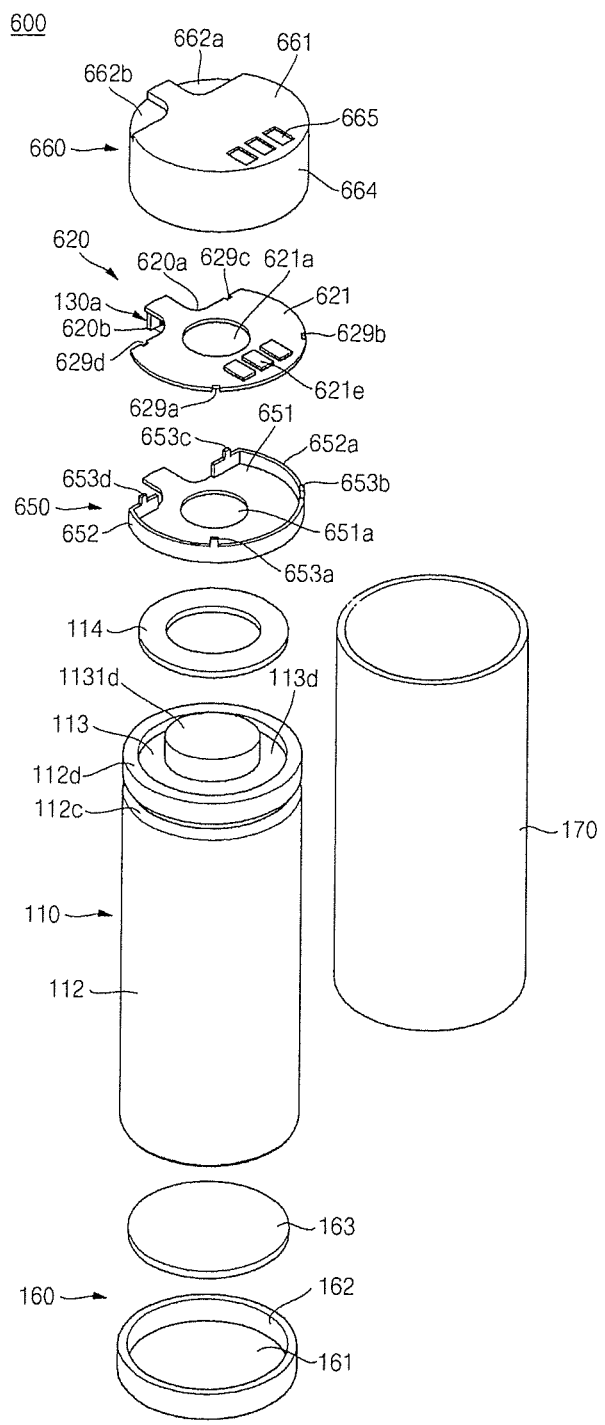
FIG. 15 is an exploded perspective view illustrating the secondary battery of FIG. 14.
Figure 16:
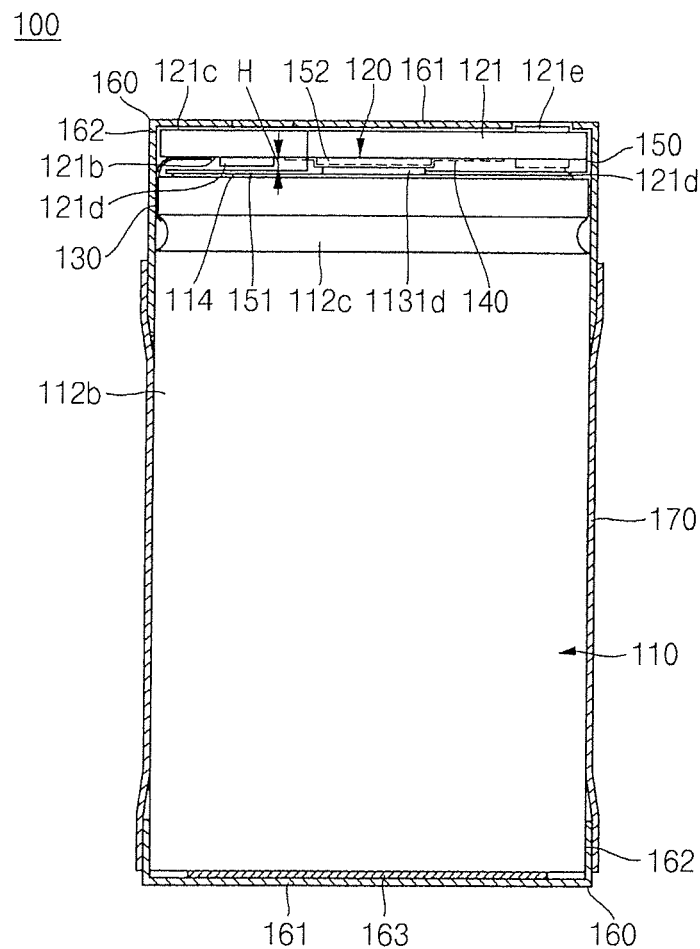
FIG. 16 is a side sectional view, taken along line C-C, illustrating the inside of a top case, a bottom case, and a label of the secondary battery of FIG. 14.
Figure 17:
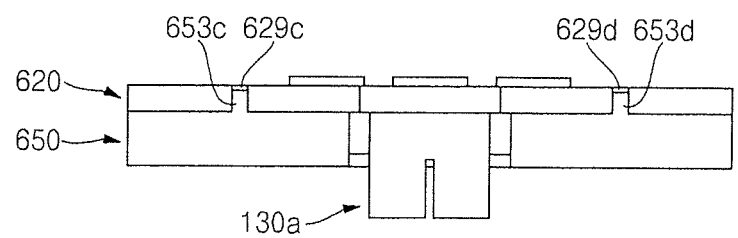
FIGS. 17 and 18 are side views illustrating a state where a protection circuit module and a supporting structure of FIG. 15 are coupled to each other.
Figure 18:
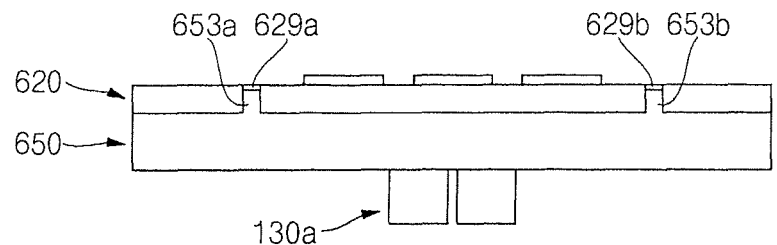

FIG. 14 is a perspective view illustrating a secondary battery according to another embodiment of the present invention, FIG. 15 is an exploded perspective view illustrating the secondary battery of FIG. 14, and FIG. 16 is a side sectional view, taken along line C-C, illustrating the inside of a top case, a bottom case, and a label of the secondary battery of FIG. 14. FIGS. 17 and 18 are side views illustrating a state where a protection circuit module and a supporting structure of FIG. 15 are coupled to each other.

Referring to FIGS. 14 through 18, a secondary battery 600 includes the bare cell 110, a protection circuit module (PCM) 620, a supporting structure 650, a top case 660, the bottom case 160, and the label 170. The secondary battery 600 uses the PCM 620 to stably charge and discharge the bare cell 110. In the current embodiment and the previous embodiments, like reference numerals denote like elements. In the current embodiment, description of the same components as those of the previous embodiments will be omitted.

The PCM 620 includes a circuit board 621, the first electrode tab 130a, and the second electrode tab 140. The PCM 620 is coupled with the bare cell 110 to control operations of the secondary battery 600 including charge/discharge of the bare cell 110.

The circuit board 621, which is a printed circuit board on which interconnection patterns are printed, has a size approximately corresponding to the upper end of the cylindrical bare cell 110. A through hole 621a providing a welding space is disposed in the center portion of the circuit board 621. First and second recesses 620a and 620b, which are recessed inward, are provided on an edge of the circuit board 621. First and second reverse insertion prevention parts 662a and 662b of the top case 660 to be described later are disposed at the first and second recesses 620a and 620b. A plurality of coupling recesses 629a, 629b, 629c, and 629d is provided on an edge of the circuit board 621. A respective one of a plurality of coupling protrusions 653a, 653b, 653c, and 653d of the supporting structure to be described later are inserted into a respective one of the plurality of coupling recesses 629a, 629b, 629c, and 629d.

The supporting structure includes a base plate 651, a supporting wall 652 upwardly extending from the base plate 651, and a plurality of coupling protrusions 653a, 653b, 653c and 653d upwardly extending from the supporting wall 652. The supporting structure 650 supports the circuit board 621. The supporting structure is made of an insulating material to insulate the circuit board 621 and electric devices 621d mounted on the circuit board 621 from the bare cell 110.

The base plate 651 has a shape and a size corresponding to the circuit board 621 of the PCM 620. The base plate 651 has a through-hole 651a formed in the center thereof. The protrusion 1131d of the electrode cap 113d of the bare cell 110 protrudes through the through-hole 651a. The base plate 651 is attached to the top of the bare cell 110 by an attachment device such as double-sided tape 114.

The supporting wall 652 upwardly extends from the edge of the base plate 651. The supporting wall 652 supports the circuit board 621 such that the circuit board 621 is not pushed toward the bare cell 110. A top 652a of the supporting wall 652 contacts a first surface of the circuit board 621.

The coupling protrusions 653a, 653b, 653c, and 653d extend from the top 652a of the supporting wall 652. Each of the coupling protrusions 653a, 653b, 653c, and 653d is positioned to correspond to a respective coupling recess 629a, 629b, 629c, and 629d of the circuit board 621. The coupling protrusions 653a, 653b, 653c, and 653d are fitted into the coupling recesses 629a, 629b, 629c, and 629d of the circuit board 621. Since the coupling protrusions 653a, 653b, 653c, and 653d are fitted into the coupling recesses 629a, 629b, 629c, and 629d, the coupled state of the PCM 620 may be stably maintained.

The base plate 651 of the supporting structure 650 has an approximately closed ring shape in comparison to the through-hole 651a in the above embodiment of the present invention, but the shape is not limited thereto. The base plate 651 of the supporting structure 650 may have an open-shape in which the through-hole 651a is open with respect to the outside. Moreover, the supporting structure 650 may be divided into several pieces.

The top case 660 includes a cover plate 661 and a side wall 664 extending downward from the cover plate 661. The top case 660 accommodates and protects the PCM 620.

The cover plate 661 has a circular shape that approximately corresponds to the cap assembly 113 of the bare cell 110. The cover plate 661 is provided with the first and second reverse insertion prevention parts 662a and 662b, and terminal holes 665. The first and second reverse insertion prevention parts 662a and 662b have recess shapes in which portions of the cover plate 661 are recessed in a direction toward the bare cell 110. The first and second reverse insertion prevention parts 662a and 662b prevent reverse inserting of the secondary battery 100 with an external load (not shown). The first and second reverse insertion prevention parts 662a and 662b are respectively disposed at the first and second recesses 620a and 620b of the circuit board 621 in the inner space of the tray cover 650. External terminals 621e of the PCM 620 are exposed to the outside through the terminal holes 665. The inner surface of the cover plate 661 is in contact with a surface of the circuit board 621 of the PCM 620. The side wall 664 extends from an edge of the top case 660 to cover the side surface of the PCM 620 and the upper portion of the side wall 112b of the bare cell 110. A hanging step is disposed at the inner surface of the side wall 664, and the hanging step is hung on the upper end of the side wall 112b of the cylindrical can 112.

Figure 19:
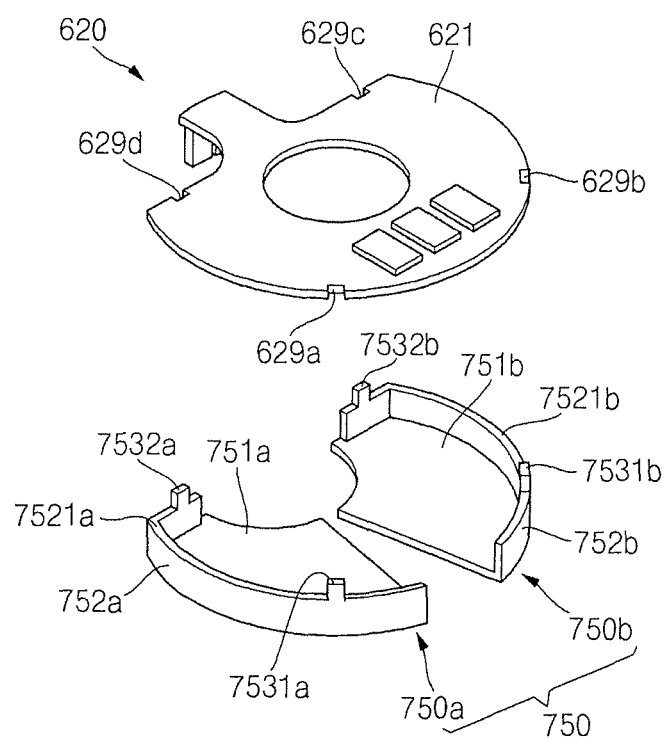
FIG. 19 is a perspective view illustrating a supporting structure and a protection circuit module that are provided in a secondary battery according to another embodiment of the present invention.

Hereinafter, a secondary battery will now be described according to another embodiment of the present invention FIG. 19 illustrates a supporting structure and a protection circuit module that are provided in a secondary battery according to another embodiment of the present invention. The same reference numerals are assigned to the same components of the secondary battery according to another embodiment of the present invention as those of the secondary battery according to the embodiment of the present invention. The detailed description of the same components of the secondary battery according to another embodiment of the present invention as those of the embodiment of the present invention will be omitted.

Referring to FIG. 19, a supporting structure 750 includes a first supporting member 750a and a second supporting member 750b.

The first supporting member 750a includes a first base plate 751a, a first supporting wall 752a upwardly extending from the first base plate 751a, and a plurality of first coupling protrusions 7531a and 7532a upwardly extending from the first supporting wall 752a. The first supporting member 750a supports a first side of the circuit board 621.

The first base plate 752a has a shape and a size corresponding to a first side of the circuit board 621. The first base plate 751a is attached to the top of the bare cell 110 by an attachment device such as double-sided tape 114.

The first supporting wall 752a upwardly extends from an edge of the first base plate 751a. A top 7521a of the first supporting wall 752a supports the edge of the circuit board 621.

The plurality of first coupling protrusions 7531a and 7532a extend upwardly from the top 7521a of the first supporting wall 752a. Each of the first coupling protrusions 7531a and 7532a is positioned to correspond to a respective one of the coupling recesses 629a and 629d of the circuit board 621. The first coupling protrusions 7531a and 7532a are fitted into the coupling recesses 629a and 629d of the circuit board 621, respectively.

The second supporting member 750b includes a second base plate 751b, a second supporting wall 752b upwardly extending from the second base plate 752b, and a plurality of second coupling protrusions 7531b and 7532b upwardly extending from the second supporting wall 752b. The second supporting member 750b supports the other side of the circuit board 621. Substantially, the second supporting member 750b has a shape symmetrical with that of the first supporting member 750a.

The second base plate 752b has a shape and a size corresponding to a second side of the circuit board 621. The second base plate 751b is attached to the top of the bare cell 110 by an attachment device such as double-sided tape 114.

The second supporting wall 752b upwardly extends from a part of the edge of the second base plate 751b. A top 7521b of the second supporting wall 752b supports the edge of the circuit board 621.

The plurality of second coupling protrusions 7531b and 7532b further upwardly extend from the top 7521b of the second supporting wall 752b. Each of the second coupling protrusions 7531b and 7532b is positioned to correspond to each of the coupling recesses 629b and 629c of the circuit board 621. The second coupling protrusions 7531b and 7532b are fitted into the coupling recesses 629b and 629c of the circuit board 621, respectively.

Since the supporting structure 750 is divided into two supporting members 750a and 750b, the supporting structure may be installed to a desired position.

Although embodiments of the present invention have been described in detail above, it should be understood that many variations and modifications of the basic inventive concept herein described will still fall within the spirit and scope of the present invention as defined in the appended claims.

What is claimed is:

1. A secondary battery comprising:
a cylindrical bare cell including a cylindrical can comprising a bottom plate and a side wall extending from the bottom plate, wherein the can is configured as a first electrode, and an electrode cap configured as a second electrode, the electrode cap coupled with the cylindrical can; and
a protection circuit module including:
a circuit board facing the electrode cap;
a first electrode tab electrically connecting the circuit board to the cylindrical can, wherein the first electrode tab is coupled to an exterior-facing surface of the side wall of the can and wherein the first electrode tab comprises:
a base attached to the circuit board; and
an extension extending from the base and enveloping an upper side of the side wall of the cylindrical can, wherein the extension comprises a first branch and a second branch spaced from each other; and a second electrode tab electrically connecting the circuit board to the electrode cap.

2. The secondary battery of claim 1, wherein the side wall of the cylindrical can has a beading recessed from the cylindrical can; and
wherein the extension of the first electrode tab includes a locker engaging the beading of the cylindrical bare cell.

3. The secondary battery of claim 1, wherein the first electrode tab comprises:
a base attached to the circuit board of the protection circuit module;
a first extension extending from the base to the cylindrical bare cell; and
a coupler bent and extending from the first extension and coupled to a top of the side wall of the cylindrical can.

4. The secondary battery of claim 3, wherein the first electrode tab further comprises a second extension extending from the coupler and partially enveloping the side wall of the cylindrical can.

5. The secondary battery of claim 3, wherein the circuit board has a cutaway adapted to expose the coupler of the first electrode tab.

6. The secondary battery of claim 1, wherein the first electrode tab comprises two first electrode tabs.

7. The secondary battery of claim 6, wherein the two first electrode tabs are opposite to each other with respect to a center of the circuit board.

8. The secondary battery of claim 1, wherein the second electrode tab comprises:
a base attached to the circuit board;
an extension bent from the base and extending toward the cylindrical bare cell; and
a coupler bent from the extension and coupled to the electrode cap of the cylindrical bare cell by welding.

9. The secondary battery of claim 8, wherein the circuit board has a through-hole corresponding to the coupler of the second electrode tab.

10. The secondary battery of claim 1, wherein the circuit board further comprises an external terminal for charging and discharging.

11. The secondary battery of claim 1, further comprising a supporting structure between the bare cell and the circuit board.

12. The secondary battery of claim 11, wherein the supporting structure comprises a base plate facing the electrode cap, and a supporting wall extending from the base plate in a direction toward the circuit board.

13. The secondary battery of claim 12, wherein an end of the supporting wall is in contact with the circuit board.

14. The secondary battery of claim 12, wherein the supporting structure further comprises a coupling protrusion extending from an end of the supporting wall, and
wherein the circuit board has a coupling recess into which the coupling protrusion is fitted.

15. The secondary battery of claim 12, wherein the electrode cap of the bare cell comprises a protrusion, and
wherein a distance between the circuit board and the protrusion is at least 0.5 mm.

16. The secondary battery of claim 12, wherein the electrode cap comprises a protrusion protruding toward the circuit board, and
wherein the base plate of the supporting structure has a through hole into which the protrusion extends.

17. The secondary battery of claim 12, wherein the base plate of the supporting structure has a shape generally corresponding to a shape of the circuit board.

18. The secondary battery of claim 12, further comprising an attachment member configured to couple the base plate to the electrode cap.

19. The secondary battery of claim 18, wherein the attachment member comprises a double-sided tape.

20. The secondary battery of claim 12, wherein the circuit board comprises a first surface facing the base plate of the supporting structure, and
wherein an electric circuit device is mounted on the first surface of the circuit board.

21. The secondary battery of claim 12, wherein the base plate of the supporting structure has a ring shape.

22. The secondary battery of claim 12, wherein the base plate of the supporting structure comprises a through hole in a center portion, and
wherein the base plate is open such that the through hole is exposed through the base plate.

23. The secondary battery of claim 11, wherein the supporting structure comprises an insulating material.

24. The secondary battery of claim 11, wherein the supporting structure comprises a first supporting member and a second supporting member that are separate from each other.

25. The secondary battery of claim 24, wherein the first and second supporting members each comprise a base plate facing the electrode cap, and a supporting wall extending from the base plate in a direction toward the circuit board.

26. The secondary battery of claim 25, wherein an end of each supporting wall is in contact with the circuit board.

27. The secondary battery of claim 25, wherein the supporting structure further comprises a coupling protrusion extending from an end of each supporting wall, and
wherein the circuit board has a coupling recess into which the coupling protrusion is fitted.

28. A secondary battery comprising:
a first cylindrical bare cell and a second cylindrical bare cell in parallel and each including a cylindrical can configured as a first electrode and an electrode cap configured as a second electrode, each electrode cap coupled with a respective cylindrical can and wherein the cylindrical can of the first cylindrical bare cell and the cylindrical can of the second cylindrical bare cell each comprise a bottom plate and a side wall extending from the bottom plate; and
a protection circuit module comprising:
a circuit board facing the electrode cap of the first cylindrical bare cell and the electrode cap of the second cylindrical bare cell;
two first electrode tabs, a respective one of the two first electrode tabs being coupled to an exterior-facing surface of the side wall of the can to electrically connect the circuit board to the cylindrical can of the first cylindrical bare cell and electrically connecting the circuit board to the electrode cap of the second cylindrical bare cell, respectively, each of the first electrode tabs comprising:
a base attached to the circuit board; and
an extension extending from the base and enveloping an upper side of the side wall of the cylindrical can, wherein the extension comprises a first branch and a second branch spaced from each other; and
a second electrode tab electrically connecting the circuit board to the electrode cap of the first cylindrical bare cell and the electrode cap of the second cylindrical bare cell.

29. The secondary battery of claim 28, wherein the secondary battery further comprises an electrode connecting tab electrically connecting the bottom plate of the first cylindrical bare cell to the bottom plate of the second cylindrical bare cell.

30. The secondary battery of claim 28, further comprising a backing member between the first cylindrical bare cell and the second cylindrical bare cell.

31. A secondary battery comprising:
a first cylindrical bare cell and a second cylindrical bare cell each including a cylindrical can comprising a bottom plate and a side wall extending from the bottom plate, wherein each can is configured as a first electrode, and an electrode cap configured as a second electrode, each electrode cap coupled with a respective cylindrical can, the first cylindrical bare cell and the second cylindrical bare cell arranged in parallel such that the electrode caps face opposite directions; and
a protection circuit module comprising:
 a circuit board facing the electrode cap of the second cylindrical bare cell;
 an electrode connecting tab coupled to an exterior-facing surface of the side wall of one of the cans to electrically connect the electrode cap of the first cylindrical bare cell to the first electrode of the second cylindrical bare cell;
 a first electrode tab electrically connecting the circuit board to the cylindrical can of the first cylindrical bare cell; and
 a second electrode tab electrically connecting the circuit board to the electrode cap of the second cylindrical bare cell, wherein the first electrode tab and the second electrode tab each comprise:
 a base attached to the circuit board; and
 an extension extending from the base and enveloping an upper side of the side wall of the cylindrical can, wherein the extension comprises a first branch and a second branch spaced from each other.

32. The secondary battery of claim 31, wherein the protection circuit module further comprises an auxiliary tab electrically connecting the circuit board to the second electrode of the second cylindrical bare cell.

* * * * *